UNITED STATES PATENT OFFICE.

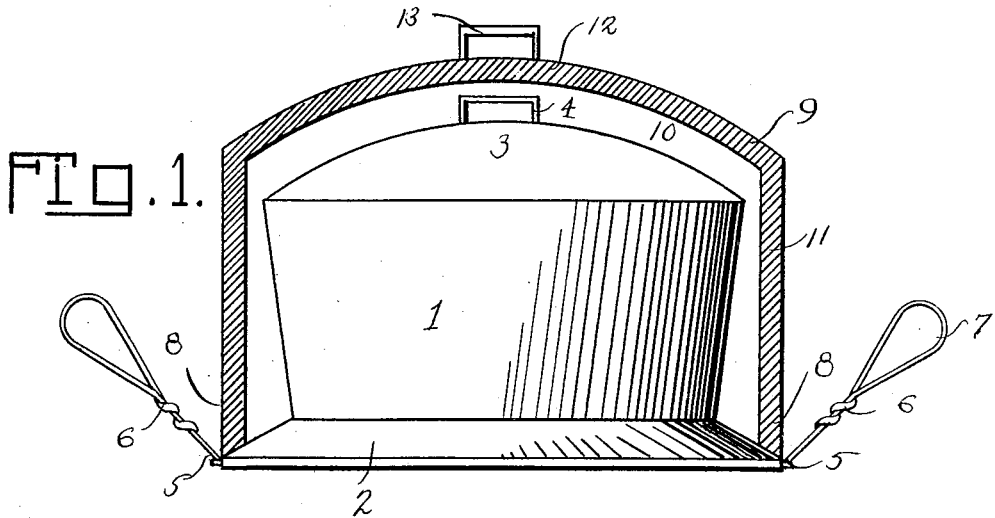
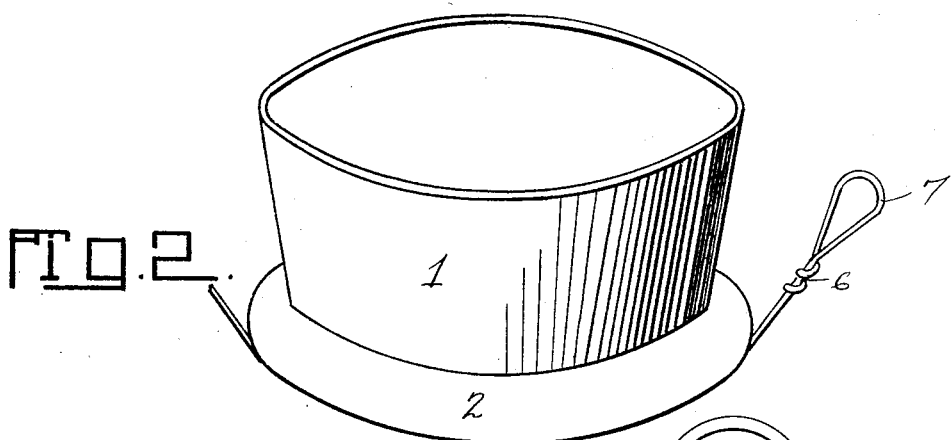
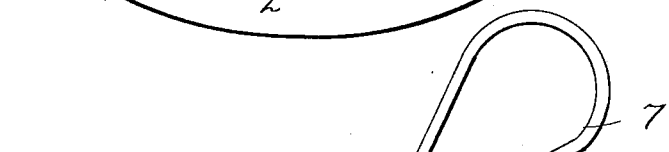

JOHN R. NYE, OF WATERVILLE, MAINE.

COOKING UTENSIL.

No. 809,129. Specification of Letters Patent. Patented Jan. 2, 1906.

Application filed March 22, 1905. Serial No. 251,431.

*To all whom it may concern:*

Be it known that I, JOHN R. NYE, a citizen of the United States, residing at Waterville, in the county of Kennebec and State of Maine, have invented certain new and useful Improvements in Cooking Utensils, of which the following is a specification, reference being had therein to the accompanying drawings.

My present invention relates to improvements in cooking utensils, and has special reference to an improved construction of bean-pot whereby beans or any other article to be cooked which requires a long time and has to be continually moistened or kept moist is properly cooked without the necessity of adding moisture thereto continually, as the structure which I provide prevents the evaporation of the moisture to such a degree, allowing the beans or other articles when thoroughly cooked to contain the proper amount of moisture. To attain these objects, I provide a novel form of cooking utensil which embodies a novel receptacle for holding the articles to be cooked, having a lid and a cover adapted to fit over the same and be held in position by a novel form or construction of handles.

In the accompanying drawings, Figure 1 is a vertical central sectional view through the cover, showing the pot in the position it assumes when the contents are being cooked or baked. Fig. 2 is a perspective view of the pot removed, and Fig. 3 is an enlarged detail view of one of the handles and support connected with the projecting rim of the pot.

Referring to the drawings, the numeral 1 designates the bean pot or receptacle, which is provided with the downwardly and outwardly projecting skirt or rim 2 and with the removable lid or cover 3, which is provided with the usual handle 4. Secured to the skirt or rim 2 and projecting outward therefrom are a plurality of wire rests 5, terminating in the coil 6 and the bailed handle 7, the said handle and coil projecting upward substantially at right angles to the portion 5. These handles may be arranged oppositely or in a plurality around the skirt without departing from the spirit of my invention.

Adapted to fit over the complete pot and have its lower rim 8 project against the skirt 2 and the portion 5 is an outer cover or dome 9, which provides an air-space 10 between its walls 11 and top 12 and the sides and top of the pot 1, the connection between the lower edge 8 of this receptacle and the skirt 2 being so close as to prevent any escape of moisture from the articles within the pot when being baked, the object being to provide a dead-air space between the walls and top of the cover 9 and the pot 1. This lid or cover is provided with a handle 13, by means of which it may be raised from over or placed over the pot 1, as may be desired, the handles or bails 7 being provided, so that the entire cooking utensil can be removed from the oven.

From the foregoing description, taken in connection with the drawings, it is evident that I provide an improved construction of cooking utensil which is adapted to bake beans, puddings, and the like which require a great length of time to properly cook and in which it would be practically impossible for the escape of moisture from the receptacle holding the articles, as the dead-air space provided by the auxiliary cover or dome will prevent this and at the same time allow the articles within the pot or receptacle to be thoroughly cooked.

What I claim as new, and desire to secure by Letters Patent, is—

1. In a cooking utensil, the combination with a receptacle having a projecting skirt at the bottom thereof and a lid at the top, of a cover or dome adapted to fit over said receptacle and have its lower edge engage the skirt to provide a dead-air space thereabove and around the receptacle.

2. In a cooking utensil, the combination with a receptacle to receive the article to be cooked having a skirt projecting outwardly from the bottom thereof, a plurality of handles connected to the skirt and extending outwardly and upwardly, and a lid for the receptacle, of a dome or cover having its lower edge engaging the skirt and adapted to incase the entire receptacle and form a dead-air space therearound.

3. In a cooking utensil, the combination with a receptacle to receive the article to be cooked having a skirt projecting outwardly from the bottom thereof, a plurality of handles connected to the skirt and extending outwardly and upwardly, and a lid for the receptacle, of a dome or cover having its lower edge engaging the skirt to surround the receptacle and form a dead-air space therearound.

4. In a cooking utensil, the combination with a receptacle to receive the articles to be cooked, consisting of a body portion, a peripheral skirt or rim secured to the exterior of the bottom thereof and projecting outwardly, a plurality of handles having their short terminals connected to the skirt so that their handles project upward substantially parallel with the body of the receptacle, and a removable lid for the receptacle of a dome or cover adapted to have its lower edge engage the skirt and fit over the receptacle to form a dead-air space therearound, consisting of a top having downwardly-projecting walls, and a handle carried by the top.

5. In a cooking utensil, the combination with a receptacle to receive the articles to be cooked, consisting of a body portion, a peripheral skirt or rim secured to the exterior of the bottom thereof and projecting upwardly, a plurality of handles having their short terminals connected to the skirt so that their handles project upward substantially parallel with the body of the receptacle and a removable lid or cover for the receptacle, of a dome adapted to have its lower edge engage the skirt and surround the receptacle to form a dead-air space therearound.

In testimony whereof I affix my signature in presence of two witnesses.

JOHN R. NYE.

Witnesses:
E. C. PRATT,
ARTHUR A. WILDER.